(12) United States Patent
Bergenwall et al.

(10) Patent No.: US 6,996,079 B1
(45) Date of Patent: Feb. 7, 2006

(54) HANDOVER AND INTERWORKING IN RADIO SYSTEM

(75) Inventors: Martin Bergenwall, Espoo (FI); Juha Räsänen, Espoo (FI); Jukka Immonen, Burlington, MA (US); Mikko Ohvo, Numminen (FI)

(73) Assignee: Nokia Corporation, Espoo (FI)

( * ) Notice: Subject to any disclaimer, the term of this patent is extended or adjusted under 35 U.S.C. 154(b) by 770 days.

(21) Appl. No.: 09/711,217

(22) Filed: Nov. 9, 2000

Related U.S. Application Data (63) Continuation of application No. PCT/FI99/00387, filed on May 10, 1999.

(30) Foreign Application Priority Data

| May 11, 1998 | (FI) | ................................. 981041 |
| Jun. 17, 1998 | (FI) | ................................. 981407 |

(51) Int. Cl.
*H04Q 7/00* (2006.01)

(52) U.S. Cl. ..................................... 370/331; 370/401

(58) Field of Classification Search ............... 370/465, 370/467, 466, 331, 328, 329, 338, 469, 401, 370/349, 311, 352, 353; 455/435, 450, 452, 455/436

See application file for complete search history.

(56) References Cited

U.S. PATENT DOCUMENTS

| 6,192,055 | B1 * | 2/2001 | Rasanen ..................... 370/465 |
| 6,197,279 | B1 * | 3/2001 | Spears .......................... 424/43 |
| 6,327,268 | B1 * | 12/2001 | Sipila ......................... 370/467 |
| 6,349,224 | B1 * | 2/2002 | Lim ........................... 455/466 |
| 6,374,112 | B1 * | 4/2002 | Widegren et al. ........ 455/452.2 |
| 6,466,556 | B1 * | 10/2002 | Boudreaux ................. 370/331 |
| 6,480,476 | B1 * | 11/2002 | Willars ....................... 370/311 |

(Continued)

FOREIGN PATENT DOCUMENTS

| EP | 0 748 136 | 12/1996 |

(Continued)

OTHER PUBLICATIONS pr ETS 300 562, "European digital cellular telecommunications system (Phase 2); Rate adaption on the Mobile Station—Base Station System (MS—BSS) interface (GSM 04.21)", *European Telecommunications Standards Institute*, pp. 1-21 (Jul. 1994).

(Continued)

*Primary Examiner*—Chau Nguyen
*Assistant Examiner*—Ricardo Pizarro
(74) *Attorney, Agent, or Firm*—Squire, Sanders & Dempsey L.L.P.

(57) ABSTRACT

The invention relates to radio systems and particularly to a handover and interworking between two radio systems utilizing different link protocols. According to the invention, in a handover the radio link protocol of the old (handover source) radio system is also retained after the handover in the new (target) radio system. The "old" radio link protocol is merely adapted to a physical traffic channel of the new radio system. One manner of implementing the adaptation to the traffic channel is to set up the radio link protocol of the "new" radio system between the mobile station and the interworking function and to transmit the radio link protocol frames of the "old" radio system within the radio link protocol of the new radio system. Due to this simple but effective arrangement, possibly ongoing sequences of selective retransmissions and retransmission requests of the old radio link protocol are not interrupted or disturbed, wherefore it is also possible to avoid the manipulation of buffer synchronization which might possibly lead to retransmission complications and loss or doubling of data as a result of the handover.

27 Claims, 4 Drawing Sheets

U.S. PATENT DOCUMENTS

| | | | |
|---|---|---|---|
| 6,542,490 B1 * | 4/2003 | Ahmadvand et al. | 370/338 |
| 6,577,868 B1 * | 6/2003 | Vialen et al. | 455/441 |
| 6,591,099 B1 * | 7/2003 | Syed et al. | 455/426.1 |
| 6,594,242 B1 * | 7/2003 | Kransmo | 370/331 |
| 6,594,486 B1 * | 7/2003 | Rasanen | 455/422.1 |
| 6,668,170 B2 * | 12/2003 | Costa et al. | 455/439 |
| 6,671,507 B1 * | 12/2003 | Vinck | 455/411 |

FOREIGN PATENT DOCUMENTS

| | | |
|---|---|---|
| EP | 0 818 938 | 1/1998 |
| GB | 2 318 258 | 4/1998 |
| WO | WO 97/28660 | 8/1997 |
| WO | WO 98/03030 | 1/1998 |

OTHER PUBLICATIONS

ETS 300 563, "European digital cellular telecommunications system (Phase 2); Radio Link Protocol (RLP) for data and telematic services on the Mobile Station—Base Station (MS—BSS) interface and the Base Station System—Mobile-services Switching Centre (BSS—MSC) interface (GSM 04.22)", *European Telecommunications Standards Institute*, pp. 1-63 (Sep. 1994).

pr ETS 300 575, "European digital cellular telecommunications system (Phase 2); Channel coding (GSM 05.03)", *European Telecommunications Standards Institute*, pp. 1-26 (Oct. 1993).

pr ETS 300 583, "European digital cellular telecommunications system (Phase 2); Terminal Adaptation Functions (TAF) for services using asynchronous bearer capabilities (GSM 07.02)", *European Telecommunications Standards Institute*, pp. 1-21 (Jul. 1994).

pr ETS 300 591, "European digital cellular telecommunications system (Phase 2); Rate adaption on the Base Station System—Mobile-services Switching Centre (BSS—MSC) interface (GSM 08.20)", *European Telecommunications Standards Institute*, pp. 1-12 (Oct. 1993).

pr ETS 300 737, "Digital cellular telecommunications system (Phase 2+); Inband control of remote transcoders and rate adaptors for Enhanced Full Rate (EFR) and full rate traffic channels (GSM 08.60 version 5.1.0)", *European Telecommunications Standards Institute*, pp. 1-35 (Sep. 1997).

* cited by examiner

HANDOVER AND INTERWORKING IN RADIO SYSTEM

This application is a continuation of international application serial number PCT/FI99/00387, filed 10 May 1999.

The invention relates to radio systems and particularly to a handover and interworking between two radio systems utilizing different link protocols.

Mobile communication systems generally refer to different telecommunication systems which enable personal wireless data transmission while subscribers roam in the system area. A typical mobile communication system is a Public Land Mobile Network (PLMN). First-generation mobile communication systems were analogue systems where speech or data was transferred in an analogue form similarly as in conventional public switched telephone networks. An example of a first-generation system is the Nordic Mobile Telephone (NMT).

In second-generation mobile systems, such as the Global System for Mobile Communication (GSM), speech and data are transmitted in a digital form. In addition to conventional speech transmission, digital mobile communication systems provide a plurality of other services: short messages, facsimile, data transmission, etc. Services provided by mobile communication systems can generally be divided into teleservices and bearer services. A bearer service is a telecommunication service which forms signal transmission between user-network interfaces. For example modem services are bearer services. In a teleservice the network also provides subscriber terminal services. Important teleservices include speech, facsimile and videotex services. Bearer services are usually divided into groups according to a property, such as asynchronous and synchronous bearer services. Each of these groups comprises a number of bearer services, such as a transparent service (T) and a non-transparent service (NT). In a transparent service the data to be transmitted is unstructured and transmission errors are corrected only by means of channel coding. In a non-transparent service the data to be transmitted is structured into protocol data units (PDU) and transmission errors are corrected by utilizing (in addition to channel coding) automatic retransmission protocols. For example in the GSM system such a link protocol is called a radio link protocol (RLP). This kind of link protocol is also generally referred to as link access control (LAC).

Currently under development are third-generation mobile communication systems, such as the Universal Mobile Communication System (UMTS) and the Future Public Land Mobile Telecommunication System (FPLMTS), which was later renamed as the International Mobile Telecommunication 2000 (IMT-2000). The UMTS is being standardized by the European Telecommunication Standards Institute (ETSI), whereas the International Telecommunication Union (ITU) standardizes the IMT-2000 system. These future systems are basically very similar. For example the UMTS, as all mobile communication systems, provides wireless data transmission services to mobile subscribers. The system supports roaming, which means that UMTS users can be reached and they can make calls anywhere as long as they are situated within the coverage area of the UMTS.

Figure 1:
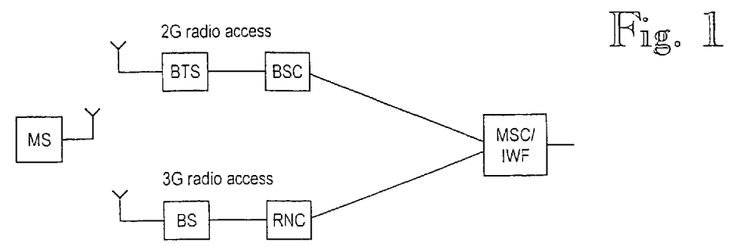

Transition to the use of third-generation mobile communication systems will take place gradually. At the beginning, third-generation radio access networks will be used in connection with network infrastructure of second-generation mobile communication systems. Such a hybrid system is illustrated in FIG. 1. A second-generation mobile services switching centre MSC is connected both to a second-generation radio access network, such as a GSM base station system BSS consisting of a base station controller BSC and base stations BTS, and to a third-generation radio access network consisting of, for example, a radio network controller RNC (and an interworking unit IWU) and base stations BS. In practice, there will be two different radio subsystems RSS, which share a common infrastructure on the network subsystem NSS level. Second-generation mobile stations MS (such as the GSM) communicate via the second-generation radio access network and third-generation mobile stations MS (such as the UMTS) communicate via the third-generation radio access network. Possible dual-mode phones (such as GSM/UMTS) are able to use either radio access network and to perform handovers between them.

Figure 2:
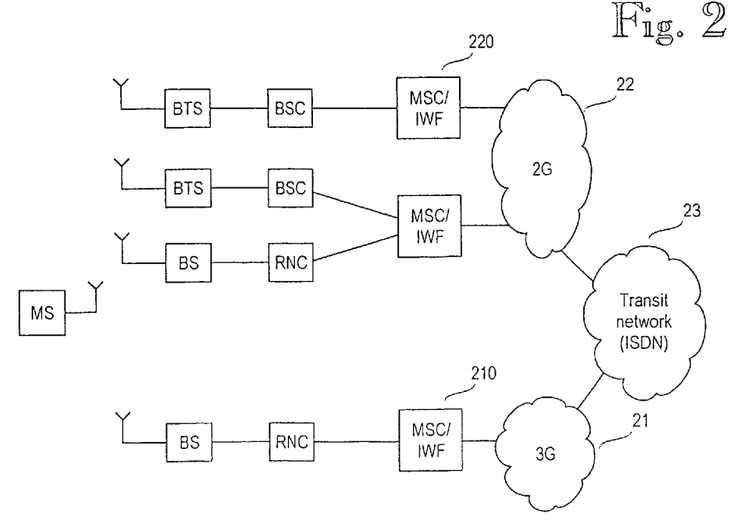
FIG. 2 shows a second-generation and a third-generation network between which dual-mode mobile stations can roam.

Since a third-generation radio access network has not been designed to be compatible with a second-generation core network (NSS), it is clear that such a mixed architecture requires interworking between the networks, usually described in the form of an interworking unit IWU. A general requirement is that no modifications are allowed in the second-generation system (mobile services switching centre MSC), which means that the interface connecting, for example, the GSM MSC and the IWU should be a pure A interface. The IWU should carry out all the conversions between the second-generation and third-generation functions and formats. Since the second-generation and third-generation retransmission protocols (such as RLP and LAC) will be at least somewhat different, interworking which will probably be needed between the second-generation and third-generation systems is the adaptation of these different protocols to each other. Subsequent development will lead to a situation where pure third-generation mobile communication networks exist in parallel with second-generation mobile systems or the aforementioned hybrid systems. FIG. 2 illustrates this situation.

An object in the development of third-generation mobile communication systems is to support a handover between a second-generation and a third-generation mobile system. A dual-mode mobile station should be able to roam from a second-generation radio access network to a third-generation radio access network and vice versa without a break in an ongoing call.

This object can be achieved rather easily for speech calls or transparent data calls. A handover causes loss or doubling of only a few bits when traffic channel protocol stacks are being swapped. Speech does not require amendment of these few bit errors, since they only cause a momentary disturbance or no noticeable change in the received speech. In transparent data transmission, end-to-end application protocols correct the bit errors that have occurred during transmission.

The situation is different when a handover is carried out for non-transparent data calls. As noted previously, in NT calls error correction is carried out (in addition to channel coding) by means of a retransmitting link protocol, such as RLP or LAC. The RLP or LAC protocols of the second-generation and third-generation mobile communication systems will be at least slightly different. Therefore it is necessary during a handover to change the link protocol and the interworking unit IWU. However, during a handover there may be ongoing complicated sequences with selective retransmissions and retransmission requests in the "old" link protocol, and an interruption may lead to loss or doubling of data, for example the data in the buffers of the old IWU is lost together with other information. However, in order to maintain data integrity it is important that not one bit is lost or doubled during the swap of the traffic channel protocol stacks. Therefore an object of the invention is to develop a handover method which maintains data integrity in a handover for a non-transparent call between two different mobile communication systems.

Another object of the invention is to provide interworking of link layer protocols between different radio systems. This is achieved with a method for performing a handover between two radio systems with different physical traffic channels and different radio link protocols comprising retransmission mechanisms, the method comprising a step of handing over a non-transparent call from a traffic channel of the old radio system to a traffic channel of the new radio system. The method is characterized according to the invention in that the method comprises further steps of retaining the radio link protocol of the old radio system between a mobile station and an interworking function, transmitting the radio link protocol frames of the old radio system adapted to the traffic channel of the new radio system.

Further, the invention relates to a data transmission method of claim 19 and to a mobile communication system of claim 27.

According to an aspect of the present invention, in a handover of the type described above the radio link protocol of the old (handover origin) radio system is also retained in the new (target) radio system after the handover. The "old" RLP is merely adapted to a physical traffic channel of the new radio system. Due to this simple but effective arrangement, possibly ongoing sequences of selective retransmissions and retransmission requests in the old RLP are not interrupted or disturbed, wherefore it is possible to also avoid the manipulation of buffer synchronization which might lead to retransmission complications and the loss or doubling of data as a result of the handover.

The adaptation of the "old" RLP to a traffic channel of the new radio system can be carried out in several different manners. One alternative is to insert the RLP frames of the old radio system into protocol data units of a lower protocol layer on the traffic channel of the new radio system in place of the RLP frames of the new RLP. This means that no RLP protocol is set up in the new radio system if it is not required for some other reason. If the length of the RLP frames of the old radio system equals the length of the RLP frames of the new radio system, the old RLP frames can be inserted as such. Usually the frame lengths of different protocols vary.

If the frames of the "old" radio link protocol are longer than the RLP frames of the "new" radio system, according to an embodiment of the invention the RLP frames of the old radio system are split into data blocks which are placed in the protocol data units of the lower protocol layer of the aforementioned new radio system traffic channel in place of the RLP frames of the new radio link protocol. If the result of the splitting is not even, in other words if the length of the RLP frame of the old radio system differs from a-multiple of the length of the RLP frame of the new radio system, filler is inserted into one or several data blocks.

If, in turn, the frames of the "old" RLP are shorter than the RLP frames of the "new" radio system, according to an embodiment of the invention RLP frames of the old radio system are concatenated, data blocks are formed from the concatenated RLP frames, the length of the blocks equalling the length of the RLP frames of the new radio system, and the data blocks are inserted into protocol data units of a lower protocol layer on a traffic channel of the new radio system in place of the RLP frames of the new RLP. If the result of the concatenation is not even, i.e. if the length of an RLP frame in the new radio system differs from a multiple of the length of an RLP frame in the old radio system, filler is inserted into one or several data blocks. It is also possible to use parts of a frame in the concatenation if there is no other way to provide data blocks of a desired length through concatenation.

The start of an "old" RLP frame can be indicated by means of a bit/bits of the underlying protocol for example in the same manner as the start of a "new" RLP frame. If the frame of the old RLP has clear frame separators (e.g. start and end flags), no separate indication is required for the frame start.

Another manner of implementing the adaptation to the traffic channel is setting up the RLP of the "new" radio system between the mobile station and the interworking unit and transmitting the RLP frames of the "old" radio system within the radio link protocol of the new radio system. However, the new radio link protocol does not require a frame retransmission mechanism but error correction is carried out with the old RLP. The only function of the new protocol is to provide a "channel" through which the old protocol frames can be transmitted. The transmission may consist of, for example, the following steps: inserting the RLP frames of the old radio system into the payload field of the RLP frames of the new radio system at the transmitting end, transmitting the RLP frames of the new radio system from the transmitting end to the receiving end, synchronizing the receiving end with the RLP frames of the new radio system, extracting the RLP frames of the old radio system from the payload field of the RLP frames of the new radio system, and operating with the extracted RLP frames according to the radio link protocol and retransmission mechanism of the old radio system. An advantage of this application based on encapsulation is it simplicity but a drawback is the overhead caused by double framing.

The old protocol (i.e. the protocol used at the beginning of the call) is retained during the entire call even though the call were handed over from one base station to another in the new radio system. If the call is returned to the old radio system at some point, the original situation preceding the first intersystem handover is restored, which means that the old radio link protocol is run normally above the lower protocol layers assigned to it.

According to another aspect of the present invention, the aforementioned problems with handover can be avoided by improving the interworking of the link layer protocols in the radio system where the radio access network normally supports a different link protocol than the MSC to which it is connected, for example because the MSC is of an older generation than the RAN. Between the MSC and the RAN there is an interworking unit IWU, which adapts the link protocol of the MSC to the RAN. This adaptation takes place such that the retransmission of data is controlled from end to end between the MSC and the mobile station by using similar frame numbering as in the link protocol between the MSC and the IWU. In such a case protocol state machines and frame retransmissions must be run at the connection end points, i.e. in the MSC and in the mobile station. Therefore the same numbering applies over the entire connection, for example between the mobile station and the MSC, even when the connection comprises two legs with different layer 2 link protocols and even different frame lengths. This simplifies the implementation of the IWU between the systems, since the IWU does not have to adapt two different frame numberings to each other but it only attends to the adaptation of different protocol functions and formats to each other and transmits the information (user data and protocol commands and responses). If either one of the protocols does not support a protocol function, the IWU may deactivate it by means of negative acknowledgement, for example, during the negotiation of the link parameters at the start of the connection. The same end-to-end numbering also enables handovers without loss or doubling of data. An important advantage of the embodiment of the invention is that it does not require modifications at the interface between the MSC and the IWU.

According to a preferred embodiment of the invention, when a connection between a mobile station and the MSC is being set up, a negotiation is carried out on the manner in which the first link protocol is adapted to the radio access network. This negotiation may be based on inband and/or outband signalling. In inband signalling the IWU carries out the modifications possibly required between the signalling of different protocols.

In an embodiment of the invention, a radio access network (e.g. a third-generation RAN) where the protocol (e.g. LAC) allows changing the frame length is connected to another radio system (e.g. a second-generation radio system) where the protocol (e.g. RLP) frame is of a fixed length. The length of the LAC frame can be selected to correspond to the length of the RLP frame such that each RLP frame and each LAC frame conveys an equal amount of data and the LAC frame numbering is directly compatible with the RLP frame numbering.

In another embodiment of the invention, a first link protocol, such as RLP, is set up from end to end between the mobile station and the MSC, and frames of the first link protocol are transferred between the IWU and the mobile station adapted to a traffic channel of the RAN such that the first link protocol is applied from end to end between the mobile station and the MSC. This requires that the mobile station supports not only the RAN link protocol, such as LAC, but also the first link protocol. In an embodiment of the invention this is implemented such that, for example, the LAC protocol comprises the RLP functionality in the form of one protocol version, for instance. When an end-to-end connection is being set up, the MSC and the mobile station negotiate through inband signalling the LAC version to be used. Therefore the IWU must understand the LAC signalling format in order for the negotiation to take place. Another alternative is that the MS or the MSC indicates already in the call set-up message that RLP should be used in order that the MS LAC would immediately start using the RLP format.

In an embodiment of the invention, the aforementioned adaptation of the first protocol, such as RLP, to the traffic channel of the RAN is implemented by inserting the RLP frames into the protocol data units of a lower protocol layer on the RAN traffic channel in place of the LAC frames. In such a case, no radio link protocol, such as LAC, is set up specifically in the RAN if it is not required for some other reason. If the RLP frames are equal in length to the LAC frames, the RLP frames can be inserted as such. Usually different protocols have different frame lengths. It is thus possible to apply the same methods as in connection with an intersystem handover.

The adaptation of the first protocol, such as RLP, to the RAN traffic channel mentioned in an embodiment of the invention is carried out by setting up another link protocol, such as LAC, between the MS and the IWU and by transmitting the RLP frames within the LAC protocol. However, it is not necessary to use a frame retransmission mechanism in the LAC protocol, but the error correction is implemented from end to end by means of the RLP protocol in the MS and the MSC. The purpose of the LAC protocol is merely to provide a "channel" through which the RLP frames can be transmitted. The transmission may comprise the following steps, for example: inserting the RLP frames into the payload field of the LAC frames at the transmitting end (the IWU or the MS), transferring the LAC frames from the transmitting end to the receiving end, synchronizing the receiving end with the LAC frames, and extracting the RLP frames from the payload field of the LAC frames. The MS operates with the extracted RLP frames in accordance with the RLP protocol and the retransmission mechanism. The IWU forwards the extracted RLP frames to the MSC. This provides the same frame numbering and retransmission mechanism from end to end. An advantage of this application based on encapsulation is its simplicity, but a drawback is the overhead caused by the double framing. The invention will be described below in greater detail in connection with preferred embodiments, with reference to the accompanying drawings, in which FIG. 1 shows a second-generation mobile communication network supplemented with a third-generation radio access network;

The present invention can be applied to a handover or interworking between any two digital radio systems with different radio link protocols. "Radio system" should be understood broadly such that different radio access networks of the same mobile network are able to form different radio systems, as illustrated in FIG. 1, or that radio systems refer to entirely separate mobile communication systems, as shown in FIG. 2. One or both of the RANs may be wireless local loop (WLL) or radio local loop (RLL) networks. The primary field of application of the invention is a handover between a second-generation and a third-generation mobile network, such as the GSM and the UMTS. "Radio link protocol" should also be understood herein generally to cover not only the present second-generation protocols, such as the RLP of the GSM system, but also all the possible third-generation or later generation link access control (LAC) protocols. In the following, the preferred embodiments of the invention will be described by using as an example the second-generation GSM system and the third-generation UMTS. In the description below, the GSM radio link protocol will be called RLP and the UMTS radio link protocol will be called LAC.

A GSM network consists of two basic parts: a base station system BSS and a network subsystem NSS. The BSS and the mobile stations MS communicate via radio connections. In the BSS, each cell is served by a base station BTS. A number of BTSs are connected to a base station controller BSC the function of which is to control radio frequencies and channels used by a BTS. The BSCs are connected to a mobile services switching centre MSC. Certain MSCs are connected to other telecommunication networks, such as the PSTN, and they comprise gateway functions for calls terminating at and originating from these networks. These MSCs are known as gateway-MSCs (GMSC). There are also at least two databases: a home location register HLR and a visitor location register VLR.

A mobile communication system comprises adapter functions for adapting an intra-network data link to the protocols used by terminal equipments and other telecommunication networks. The adapter functions typically include a terminal adaptation function TAF placed at the interface between a mobile station and a data terminal equipment connected thereto, and an interworking function IWF situated at the interface between the mobile network and another telecommunication network, usually in connection with an MSC. In the GSM system a data link is set up between a TAF of the MS and an IWF in the mobile network. The TAF adapts a data terminal equipment DTE connected to the MS to the aforementioned GSM data link that is set up over a physical connection using one or several traffic channels. The IWF connects the GSM data link for example to another telecommunication network, such as an ISDN or another GSM network, or to some other transit network, such as a PSTN.

Figure 3:
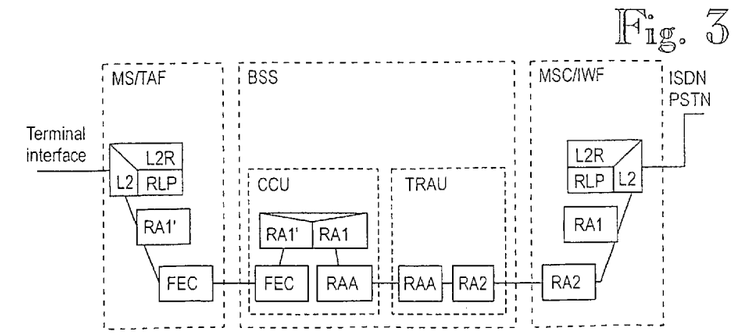
FIG. 3 shows a protocol stack of a non-transparent data service in the GSM system.

FIG. 3 illustrates protocols and functions required for non-transparent bearer services. A non-transparent circuit switched connection between a TAF and an IWF on a GSM traffic channel comprises several protocol layers that are common to all these services. They include different rate adaptation RA functions, such as RA1' between the TAF and a channel codec unit CCU placed in the BSS, RA1 between the CCU and the IWF, RAA (or RAA' for a 14.4 kbit/s channel) between the CCU and a transcoder unit TRAU placed remote from the base station, and RA2 between the TRAU and the IWF. The rate adaptation functions RA are defined in the GSM recommendations 04.21 and 08.20. Communication between the CCU and the TRAU is defined in the GSM recommendation 08.60. Information that has been RA1' rate-adapted in the radio interface is also channel-coded as defined in the GSM recommendation 5.03, which is illustrated by blocks FEC in the MS and the CCU. The IWF and the TAF also comprise higher-level protocols that are specific to each service. In an asynchronous non-transparent bearer service the IWF requires an L2R (layer 2 relay) protocol and a radio link protocol RLP and a modem or a rate adapter towards the fixed network. The L2R functionality for non-transparent character oriented protocols is defined for example in the GSM recommendation 07.02. The RLP is defined in the GSM recommendation 04.22. The RLP is a frame-structured, balanced (HDLC-type) data transmission protocol, where error correction is based on retransmission of distorted frames at the request of the receiving party. The interface between the IWF and for example an audio modem MODEM is as defined in CCITT V.24 and it is denoted in FIG. 3 by L2. This non-transparent configuration is also used to access the Internet.

The RA1 and RA1' rate adaptations map each 240-bit RLP frame into four modified 80-bit V.110 frames (between the MSC and the BSS) or into four modified 60-bit V.110 frames (at the radio interface). A bit sequence called "Frame Start Identifier" is used to indicate which V.110 frame in the bit stream is the first one for a particular RLP frame. The first quarter of the RLP frame is transmitted in this V.110 frame, the second quarter is transmitted in the next frame, the third quarter in the third frame and the fourth one in the fourth frame, whereafter a new RLP frame begins.

In the HSCSD concept of the GSM system, a high-speed data signal is divided into separate data streams, which are then transmitted via N subchannels (N traffic channel time slots) at the radio interface. When the data streams have been divided they are conveyed in the subchannels as if they were mutually independent until they are again combined in the IWF or the MS. However, logically these N subchannels belong to the same HSCSD connection, i.e. they form one HSCSD traffic channel. According to the GSM recommendations dividing and combining a data stream are carried out in a modified RLP, which is thus common to all the subchannels. Below this common RLP each subchannel comprises separately the same protocol stack RA1'-FEC—FEC-RA1'-RAA—RAA-RA2-RA2-RA1, which is shown in FIG. 3 for one traffic channel between the MS/TAF and the MSC/IWF. Therefore an HSCSD traffic channel according to the GSM recommendations still uses the common RLP for the different subchannels even though the bit rate on a single subchannel may be as high as 64 kbit/s.

An example of a third-generation network is the UMTS, which is still under development. It should be noted that the detailed structure of the UMTS access network is not significant for the invention. According to the simplest scenario the UMTS is an access network the functions of which are strictly limited to radio access functions. Therefore it mainly comprises functions for controlling radio resources (handover, paging) and for controlling bearer services (radio network service control). The more complicated functions, such as registers, register functions, mobility management and location management, are placed in a separate network subsystem NSS or in the core network. The NSS or the core network may be, for example, the GSM infrastructure. In FIGS. 1 and 2 the third-generation radio access network comprises base stations BS, a radio network controller RNC and an interworking unit IWU. It is further assumed that the third-generation system employs the link access control LAC protocol between the MS and the MSC/IWF, the protocol differing from second-generation radio link protocols, such as the RLP. A physical traffic channel comprises lower protocols, in the frames of which the LAC frames are transmitted. In principle a protocol stack of a third-generation mobile communication system may be similar as described above in connection with the GSM system, except that RLP is replaced with LAC.

In the following, a handover according to the invention will be illustrated with an example where a dual-mode mobile station (operating in two or more different mobile communication systems) moves from a third-generation mobile system 21 to a second-generation GSM system 22 in FIG. 2. The mobile station MS is engaged in a data call in the third-generation system 21, the call reserving a physical traffic channel between the MS and the MSC/IWF 210. An LAC protocol utilizing retransmission of LAC frames for error correction is also set up between the MS and the IWF 210.

It is further assumed that the MS moves to the area of the GSM system 22 and the MSC/IWF 210 makes a decision, for example based on base station signal measurements reported by the MS, that the MS should perform a handover to the GSM system 22. The MSC/IWF 210 transmits a handover request to the MSC/IWF 220 and allocates transmission channels between the exchanges. In some systems the MS is able to make a decision and initiate a handover. The MSC/IWF 220 or the MS requests the relevant base station BTS to allocate a traffic channel for the call, connects the traffic channel between the BTS and the MSC, and indicates the allocated traffic channel to the MSC/IWF 210. The MSC/IWF 210 transmits an MS handover command via the present serving base station BS to command the MS to the allocated traffic channel in the GSM system 22. The MS moves to the GSM traffic channel. The MSC/IWF 220 switches the call transparently through to the old exchange MSC/IWF 210, which operates as an anchor point in the handover. The MSC/IWF 210 implements the required rate adaptation to the GSM traffic channel and to the transmission channel between the exchanges. The MSC/IWF 210 releases the old traffic channel at the base station BTS and the related resources in the network.

According to the basic principles of the invention, the MS and the MSC/IWF 210 retain the link protocol LAC of the old system 21 also after the handover even though the new system normally employs the RLP. The LAC is adapted to the physical GSM traffic channel such that the LAC frames can be transmitted through the traffic channel. In the example described herein, an LAC protocol unit situated in the MSC/IWF 210 transmits downlink LAC frames in a GSM rate-adapted form to the MSC/IWF 220, which then switches through to the base station system. The LAC frames are transmitted through the GSM traffic channel to the MS, where the LAC unit (TAF) processes them similarly as before the handover in the system 21. Correspondingly in the uplink direction, the MS adapts the uplink LAC frames into the GSM traffic channel and transmits them to the MSC/IWF 220. The MSC/IWF 220 forwards the LAC frames as such to the MSC/IWF 210. The MSC/IWF 210 processes the uplink LAC frames similarly as the LAC frames received via the BS before the handover. If an LAC frame is corrupted or lost during the transmission, the receiving party requests the transmitting party to retransmit the frame.

Figure 4:
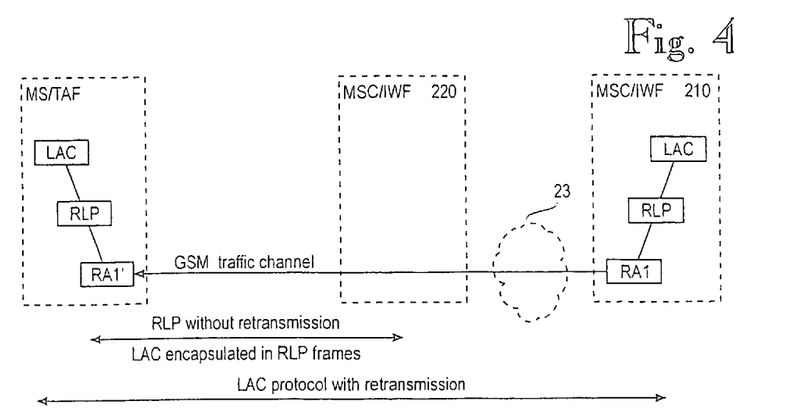
FIG. 4 shows the protocol stack after a handover according to the invention from a third-generation system to the GSM system when LAC is transmitted over a GSM traffic channel encapsulated in RLP frames.

Adaptation of the LAC radio link protocol to the GSM traffic channel can be implemented in various ways. In the preferred embodiment of the invention, an RLP protocol is set up in the GSM radio system between the MS/TAF and the MSC/IWF 210, and the LAC frames are transmitted through the GSM traffic channel in the data fields of the RLP frames. The RLP frames can be transmitted without retransmissions and acknowledgements for example by means of UI (unnumbered information) frames according to the principles of the RLP protocol. In the present handover example a protocol stack as shown in FIG. 4 is provided. The LAC protocol units are situated in the MS/TAF and the MSC/IWF 210. For example in the downlink direction the MSC/IWF 210 transmits the LAC frames encapsulated in the RLP frames (possibly through a transmission network 23) to the MSC/IWF 220. The RLP frames are transmitted in a manner specified for the GSM traffic channel to the MS/TAF, where the RLP unit synchronizes with the RLP frames and extracts the contents of the frames in order to reconstruct the LAC frames. The LAC frames are thereafter supplied to the LAC unit, which processes them similarly as the LAC frames received before the handover. The transmission in the uplink direction takes place in the same manner but in reverse order.

Figure 5:
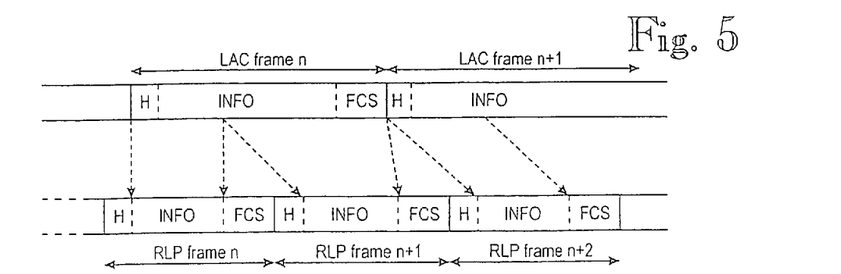
FIG. 5 illustrates the encapsulation of an LAC frame in an RLP frame.

FIG. 5 illustrates the insertion of the LAC frames into the RLP frames when the length of an LAC frame is double the length of the data field INFO of an RLP frame. In such a case the first half of LAC frame n is inserted into the data field of RLP frame m and the second half is inserted into the data field of RLP frame m+1. The next LAC frame m+1 is inserted correspondingly into RLP frames m+2 and m+3. If the size of the LAC frame and the data field INFO is not a multiple of the data field INFO of the RLP frame, filling bits may be used in one or several RLP frames. If the LAC frame is shorter than the data field INFO of the RLP frame, one or more LAC frames can be inserted into one RLP frame. It is also possible to use filling bits, if required.

The encapsulation of the RLP frames described above is easy to implement, but its drawback is the additional overhead caused by the RLP frames, consuming the capacity of the transmission link.

Figure 6:
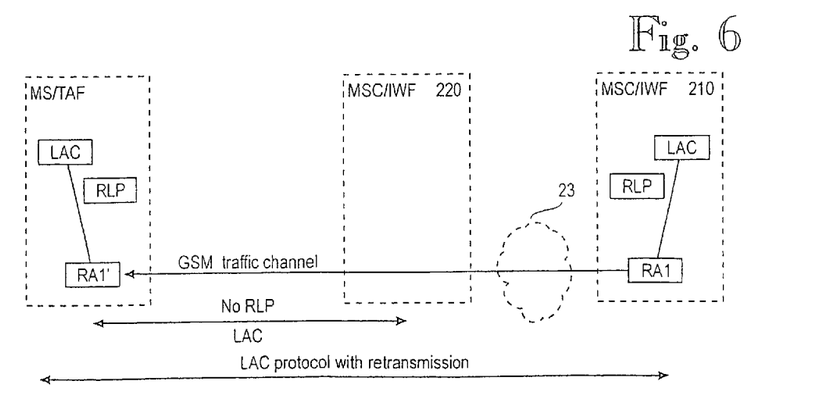
FIG. 6 shows the protocol stack after a handover according to the invention from a third-generation system to the GSM system when the LAC is conveyed in rate adaptation layers below the RLP layer of the GSM traffic channel instead of the RPL.

According to another embodiment of the invention, RLP protocol is not set up at all on the GSM traffic channel, but the LAC frames are adapted directly to the lower protocol layers of the GSM traffic channel, i.e. to the rate adaptation layers. In the handover situation illustrated in the example the result is a protocol stack as shown in FIG. 6. The MSC/IWF 210 transmits AC frames to the MSC/IWF 220 inserted into the rate adaptation protocols (RA1) in place of the RLP frames. The MSC/IWF 220 switches the bit stream through towards the base station system. In the MS the RA1' extracts the LAC frames and forwards them to the LAC unit, which processes the frames similarly as the frames received before the handover. In the uplink direction the transmission occurs in the same way but in reverse order.

If the length of an LAC frame equals the length of an RLP frame, the LAC frames can be inserted as such in place of the RLP frames. In other words, in the GSM system RA1 and RA1' rate adaptations map each LAC frame into four modified V.110 frames. One quarter of an LAC frame is transmitted in each V.110 frame.

Figure 7:
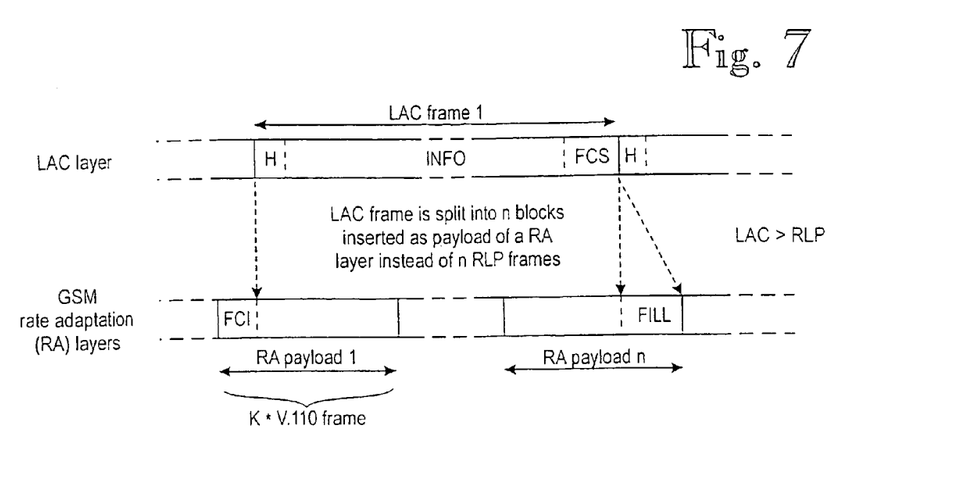
FIG. 7 illustrates the transmission of an LAC frame in GSM rate adaptation layers when the LAC frame is longer than the RLP frame.

If the LAC frame is longer than the RLP frame, the transmission of one LAC frame requires the transmission capacity needed by more than one RLP frame. This is illustrated in FIG. 7. FIG. 7 shows the GSM rate adaptation layers in the form of payload units RA_PAYLOAD for the sake of illustration. One payload unit RA_PAYLOAD refers to the payload capacity normally used to transmit an RLP frame in the GSM rate adaptation layers. According to the present GSM specifications, this equals the data fields of four V.110 frames. The LAC frame 1 is divided into n data blocks, which are inserted as payload of the rate adaptation layer instead of n RLP frames. At the beginning of the first payload unit RA_PAYLOAD there is a frame start identifier FCI, which indicates that the LAC frame has started. The formed n data blocks are inserted into corresponding payload blocks RA_PAYLOAD 1 ... n. If the length of the LAC frame is not a multiple of one RLP frame, for example in the last payload unit RA_PAYLOAD the free bit positions can be filled with filler FILL. If the LAC frames comprise clear frame separators, no external indication for the frame start is required.

Figure 8:
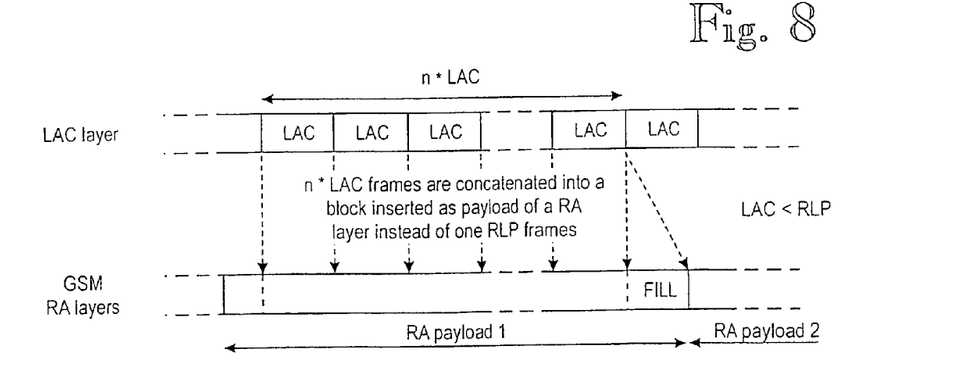
FIG. 8 illustrates the transmission of an LAC frame in the GSM rate adaptation layers when the LAC frame is shorter than the RLP frame.

If the LAC frame is shorter than the RLP frame, the LAC frames (and possibly parts of a frame) are concatenated into a longer data block which is inserted as the payload of the rate adaptation layer instead of one RLP frame. FIG. 8 illustrates a situation where n LAC frames are inserted into one payload unit RA_PAYLOAD. The start of each LAC frame can be indicated, for example, by means of the frame start identifier FCI, as shown in FIG. 7. If the LAC frame comprises clear frame separators or the frames have a fixed length, no external indication of the frame start is required. If the RLP frame is longer than a multiple of the LAC frame, filler FILL can be inserted into the free bit positions of the payload unit, as shown in FIG. 8.

If the MS is later transferred from the GSM system 22 back to the third-generation system 21 by a handover, the situation preceding the first handover is restored. In other words, a traffic channel is set up between the MS and the MSC/IWF 210, and the LAC protocol units are transferred over this traffic channel in a manner specific to the system.

The above description illustrated an example where a call was set up first in a third-generation mobile system and then transferred by a handover to the GSM system. The invention is naturally also applicable in the opposite direction, i.e. in a situation where a call is first set up in the GSM system and then handed over to a third-generation mobile system. In such a case the first protocol is RLP, which is retained during the entire call. When the call is transferred to the third-generation mobile communication network, the RLP is retained and adapted to the traffic channel of the new system similarly as the LAC frames were adapted to the GSM traffic channel above. In other words, the RLP frames and the LAC frames change places in the description of FIGS. 4 to 8.

A handover between a pure second-generation and a pure third-generation mobile communication system was described above as an example. A handover can be carried out in a similar manner also between different radio networks in a hybrid system as shown in FIG. 1 or in a second-generation hybrid system 22 as shown in FIG. 2. If both radio networks operate under the same MSC, the handover and the protocol configuration between the MS and the MSC/IWF 210 are similar to those shown in FIGS. 4 and 6, except that there is naturally no transit network 23 or a second exchange which performs the through switching.

In recently introduced telecommunication systems a mobile station can be connected to an access point in a fixed network for example by connecting the MS to a data terminal equipment (computer) connected to the fixed network. The fixed network can also be a local area network LAN. At least in some cases a call (data communication) has been routed from the mobile station via the fixed network to the MSC (or to a certain gateway point in the mobile network) and from there to the other party of the call. In other words, the fixed network operates as an access network instead of a radio access network. It is possible to use between the MSC and the MS the link protocol LAC, which is also applicable over the radio path. It is then possible to perform a handover according to the invention from a fixed network subscriber connection to the RAN of the mobile network so that the LAC used in the fixed network call is also retained in the mobile network, for example as described above in connection with FIGS. 4 to 8. A handover can be carried out similarly from the mobile network to an access point in the fixed network by retaining the protocol of the mobile network, such as the RLP. In each case the same MSC (or gateway point) operates as an anchor point in the handover. A handover can be carried out similarly from an access point in the fixed network to an access point in another fixed network, while the protocol of the first network is retained.

According to another aspect of the present invention, the aforementioned problems with handover can be avoided by improving the interworking of the link layer protocols in the interworking unit IWU between the third-generation radio access network and the second-generation (GSM) MSC, for example in the systems shown in FIGS. 1 and 2. This takes place such that the retransmission of data is controlled from end to end between the MSC and the mobile station by using similar frame numbering as in the link protocol between the MSC and the IWU.

Figure 9:
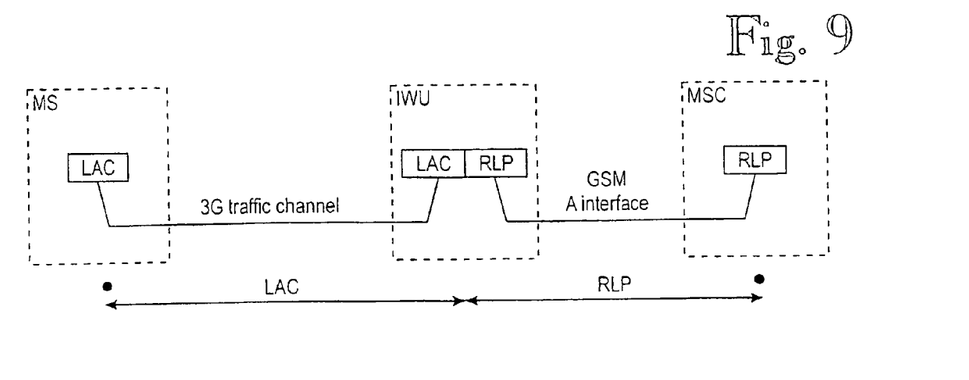
FIGS. 9 to 11 illustrate an interworking function according to the invention between two radio systems utilizing different link protocols.

FIG. 9 illustrates interworking according to the invention. In a third-generation radio access network an LAC protocol is set up between an MS and an IWU. An RLP protocol is set up between the IWU and a second-generation MSC (GSM). The IWU implements the required protocol conversions from the RLP to the LAC and vice versa. The length of the LAC frame can be selected to correspond to the length of the RLP frame such that each RLP frame and each LAC frame conveys the same amount of data and the LAC frame numbering is directly compatible with the RLP frame numbering. The frame length may be fixedly determined or the MS and the MSC may negotiate the length at the beginning of the connection by means of inband signalling. Therefore the received frames are acknowledged from end to end, and complete protocol units and state machines supporting retransmission are only required in the MSC and the MS even though the end-to-end connection utilizes both the RLP and the LAC protocol.

Figure 10:
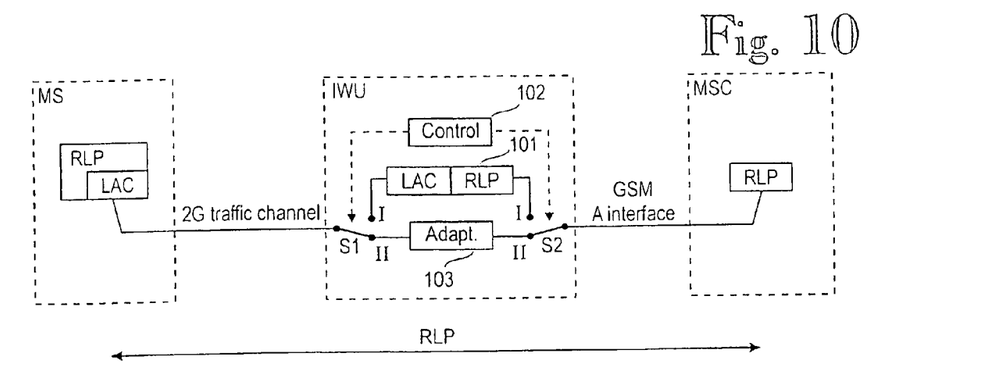
Figure 11:
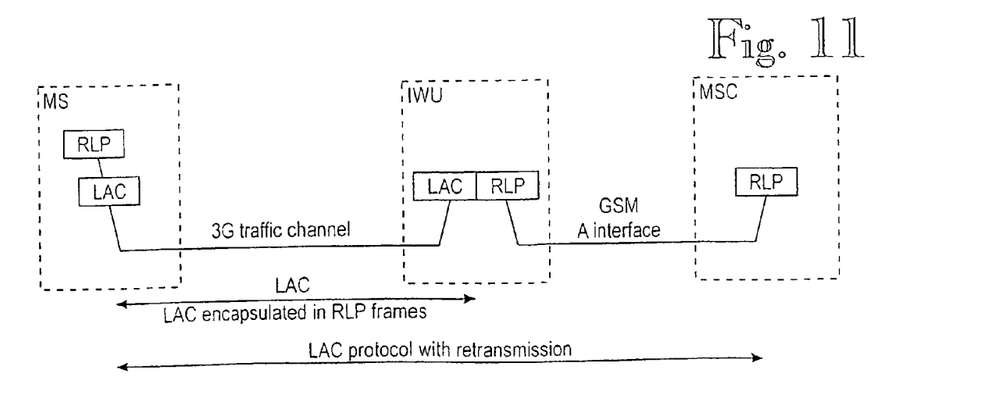

FIGS. 10 and 11 illustrate situations where an end-to-end RLP protocol is possible between the MS and the IWU when the RLP is adapted to a traffic channel of a third-generation radio access network according to the above-described principles.

In FIG. 10, the LAC protocol of the MS comprises the RLP functionality as one protocol version. When an end-to-end connection is being set up, the MSC and the MS negotiate, by means of inband signalling (e.g. XID signalling), the LAC version to be used. Therefore the IWU should understand the LAC signalling format in order that the negotiation may take place. In the embodiment shown in FIG. 10, the IWU comprises an RLP/LAC conversion unit which performs the conversions between the RLP and LAC signalling at the beginning of the connection so that the negotiation may take place (switches S1 and S2 in position I). A control unit 102 monitors the negotiation and as it detects that the selected protocol version is RLP, it directs the connection through a channel adapter 103 (S1 and S2 in position II). Alternatively, the IWU may actively participate in the negotiation instead of merely converting and forwarding signalling. Another alternative is that the MS or the MSC indicates already in the call set-up message that the RLP protocol should be used so that the MS LAC would start immediately using the RLP format. In such a case the IWU does not necessarily have to comprise any other elements than the channel adapter 103.

In FIG. 10, the channel adapter 103 and the MS adapt the RLP protocol frames to a traffic channel of the radio access network by inserting the RLP frames into protocol data units of a lower protocol layer on the traffic channel of the radio access network in place of the LAC frames. In such a case no LAC protocol is set up in the radio access network if it is not required for some other reason. This interworking can be implemented according to the exactly same principles as described above in connection with FIG. 6.

In FIG. 11, the MS comprises the RLP functionality over the LAC protocol unit, and the IWU comprises the RLP/LAC protocol conversion. In such a case an LAC protocol is always set up between the MS and the IWU. Retransmission of the LAC frames is not necessarily required. An RLP protocol where retransmission and error correction are carried out is set up from end to end between the MS and the MSC. The MS and the IWU adapt the RLP protocol to an RAN traffic channel by transmitting the RLP frames inside the LAC protocol. The purpose of the LAC protocol is to merely provide a "channel" through which the RLP frames can be transmitted. The function of the IWU is to pack the RLP frames received from the MSC into LAC frames and to unpack the RLP frames from the LAC frames and to forward them to the MSC. Otherwise the same principles which were described above in connection with FIG. 5 can be applied to this tunneling.

It is obvious that as the technology develops the basic idea of the invention can be implemented in several different manners. Therefore the invention and its embodiments are not restricted to the examples described above but they may vary within the scope of the claims.

What is claimed is:

1. A handover method between two radio systems with different physical traffic channels and different radio link protocols comprising retransmission mechanisms, wherein length of the radio link protocol frames of the old radio system equals length of the radio link protocol frames of the new radio system, the method comprising:

handing over a non-transparent call from a traffic channel of an old radio system to a traffic channel of a new radio system;

retaining the radio link protocol of the old radio system between a mobile station and an interworking function; and transmitting radio link protocol frames of the old radio system adapted to the traffic channel of the new radio system by inserting the radio link protocol frames of the old radio system as such into protocol data units of a lower protocol layer on the traffic channel of the new radio system in place of the radio link protocol frames of the new radio link protocol.

2. A handover method between two radio systems with different physical traffic channels and different radio link protocols comprising retransmission mechanisms, wherein the radio link protocol frames of the old radio system are longer than radio link protocol frames of the new radio system, the method comprising:

handing over a non-transparent call from a traffic channel of an old radio system to a traffic channel of a new radio system;

retaining the radio link protocol of the old radio system between a mobile station and an interworking function; and transmitting radio link protocol frames of the old radio system adapted to the traffic channel of the new radio system by splitting the radio link protocol frames of the old radio system into data blocks and by inserting said data blocks into the protocol data units of the lower protocol layer on the traffic channel of the new radio system in place of the radio link protocol frames of the new radio link protocol.

3. The method according to claim 2, wherein the inserting step comprises:

inserting filler into one or several data blocks when the length of the radio link protocol frame in the old radio system is different from a multiple of the length of the radio link protocol frame in the new radio system.

4. A handover method between two radio systems with different physical traffic channels and different radio link protocols comprising retransmission mechanisms, wherein the radio link protocol frames of the old radio system are shorter than the radio link protocol frames of the new radio system, the method comprising:

handing over a non-transparent call from a traffic channel of an old radio system to a traffic channel of a new radio system;

retaining the radio link protocol of the old radio system between a mobile station and an interworking function; and transmitting radio link protocol frames of the old radio system adapted to the traffic channel of the new radio system by:

concatenating the radio link protocol frames of the old radio system, forming from the concatenated radio link protocol frames data blocks the length of which equals the length of the radio link protocol frames of the new radio system, and inserting said data blocks into the protocol data units of the lower protocol layer on the traffic channel of the new radio system in place of the radio link protocol frames of the new radio link protocol.

5. The method according to claim 4, wherein the inserting step comprises:

inserting filler into one or several data blocks if the length of the radio link protocol frame in the new radio system is different from a multiple of the length of the radio link protocol frame in the old radio system.

6. The method according to claim 4, wherein the inserting step comprises:

inserting into each data block one or more complete radio link protocol frames and a part of a radio link protocol frame in a concatenated form, if the length of the radio link protocol frame in the new radio system is different from a multiple of the length of the radio link protocol frame in the old radio system.

7. A handover method between two radio systems with different physical traffic channels and different radio link protocols comprising retransmission mechanisms, the method comprising:

handing over a non-transparent call from a traffic channel of an old radio system to a traffic channel of a new radio system;

retaining the radio link protocol of the old radio system between a mobile station and an interworking function;

setting up the radio link protocol of the new radio system between the mobile station and the interworking function; and transmitting the radio link protocol frames of the old radio system transparently within the radio link protocol of the new radio system without using a retransmission mechanism of the latter.

8. The method according to claim 7, wherein said transmitting step comprises steps of:

inserting the radio link protocol frames of the old radio system into the payload field of the radio link protocol frames of the new radio system at a transmitting end;

transmitting the radio link protocol frames of the new radio system from the transmitting end to a receiving end without using the retransmission mechanism;

synchronizing the receiving end with the radio link protocol frames of the new radio system;

extracting the radio link protocol frames of the old radio system from the payload field of a radio link protocol frames of the new radio system; and operating with the extracted radio link protocol frames according to the radio link protocol and retransmission mechanism of the old radio system.

9. The method according to claim 7, further comprising a step of:

performing a handover from the traffic channel of the new radio system back to the traffic channel of the old radio system, and wherein the retaining step comprises retaining the radio link protocol of the old radio system in the mobile station and in the interworking function.

10. The method according to claim 7, wherein the new and the old radio system are separate mobile communication systems or different radio access networks of the same mobile system.

11. A dual-mode mobile station with capacity to operate between two radio systems with different physical traffic channels and different radio link protocols comprising retransmission mechanisms, the mobile station comprising:
  adapter means for establishing a first radio link protocol in a non-transparent call between the mobile station and an interworking function in a first radio system, and a second radio link protocol between the mobile station and the interworking function in a second radio system; and
  means for performing a handover for the non-transparent call from a traffic channel of the first radio system to a traffic channel of the second radio system and vice versa,
  wherein, in the station,
  said adapter means is arranged to retain a radio link protocol of an old radio system between the mobile station and the interworking function in a handover that is carried out from the traffic channel of the first radio system to the traffic channel of the second radio system, or vice versa,
  said adapter means is arranged to transmit the radio link protocol frames of the old radio system adapted to the traffic channel of the new radio system, and said adapter means is arranged to insert the radio link protocol frames of the old radio system into protocol data units of a lower protocol layer on the traffic channel of the new radio system in place of the radio link protocol frames of the new radio link protocol either as such, or split into data blocks or concatenated into data blocks, depending on whether the length of the radio link protocol frames of the radio system is equal to, longer than or correspondingly shorter than the length of the radio link protocol frames of the new radio system.

12. A dual-mode mobile station with capacity to operate between two radio systems with different physical traffic channels and different radio link protocols comprising retransmission mechanisms, the mobile station comprising:
  adapter means for establishing a first radio link protocol in a non-transparent call between the mobile station and an interworking function in a first radio system, and a second radio link protocol between the mobile station and the interworking function in a second radio system; and
  means for performing a handover for the non-transparent call from a traffic channel of the first radio system to a traffic channel of the second radio system and vice versa,
  wherein, in the station,
  said adapter means is arranged to retain a radio link protocol of an old radio system between the mobile station and the interworking function in a handover that is carried out from the traffic channel of the first radio system to the traffic channel of the second radio system, or vice versa,
  said adapter means is arranged to transmit the radio link protocol frames of the old radio system adapted to the traffic channel of the new radio system, and said adapter means is also arranged to set up the radio link protocol of the new radio system between the mobile station and the interworking function, and to transmit the radio link protocol frames of the old radio system transparently within the radio link protocol of the new radio system without using a retransmission mechanism of the latter.

13. The mobile station according to claim 12, wherein said adapter means is arranged to transmit the radio link protocol frames of the old radio system transparently in a payload field of the radio link protocol frames of the new radio system.

14. A dual-mode mobile station with capacity to operate between two radio systems with different physical traffic channels and different radio link protocols comprising retransmission mechanisms, the mobile station comprising:
  adapter means for establishing a first radio link protocol in a non-transparent call between the mobile station and an interworking function in a first radio system, and a second radio link protocol between the mobile station and the interworking function in a second radio system; and
  means for performing a handover for the non-transparent call from a traffic channel of the first radio system to a traffic channel of the second radio system and vice versa,
  wherein, in the station,
  said adapter means is arranged to retain a radio link protocol of an old radio system between the mobile station and the interworking function in a handover that is carried out from the traffic channel of the first radio system to the traffic channel of the second radio system, or vice versa,
  said adapter means is arranged to transmit the radio link protocol frames of the old radio system adapted to the traffic channel of the new radio system, and said adapter means is arranged to retain the radio link protocol of the old radio system in the mobile station and in the interworking function if a handover is later carried out from the traffic channel of the new radio system back to the traffic channel of the old radio system.

15. A telecommunication system comprising an arrangement for performing a handover between two radio systems with different physical traffic channels and different radio link protocols, wherein a mobile station and an interworking function are arranged to retain the radio link protocol of an old radio system when a handover for a non-transparent call is carried out from a traffic channel of the old radio system to a traffic channel of a new radio system, and to transmit the radio link protocol frames of the old radio system adapted to the traffic channel of the new radio system, wherein the mobile station and the interworking function are arranged to insert radio link protocol frames of the old radio system into protocol data units of a lower protocol layer on the traffic channel of the new radio system in place of radio link protocol frames of the new radio link protocol either as such, or split into data blocks or concatenated into data blocks, depending on whether the length of the radio link protocol frames of the radio system is equal to, longer than or correspondingly shorter than the length of the radio link protocol frames of the new radio system.

16. A telecommunication system comprising an arrangement for performing a handover between two radio systems with different physical traffic channels and different radio link protocols, wherein a mobile station and an interworking function are arranged to retain the radio link protocol of an old radio system when a handover for a non-transparent call is carried out from a traffic channel of the old radio system to a traffic channel of a new radio system, and to transmit the radio link protocol frames of the old radio system adapted to the traffic channel of the new radio system, wherein the mobile station and the interworking function are also arranged to set up the radio link protocol of the new radio system between the mobile station and the interworking function, and to transmit the radio link protocol frames of the old radio system transparently within the radio link protocol of the new radio system without using retransmission mechanism of the latter.

17. A telecommunication system comprising an arrangement for performing a handover between two radio systems with different physical traffic channels and different radio link protocols, wherein a mobile station and an interworking function are arranged to retain the radio link protocol of an old radio system when a handover for a non-transparent call is carried out from a traffic channel of the old radio system to a traffic channel of a new radio system, and to transmit the radio link protocol frames of the old radio system adapted to the traffic channel of the new radio system, wherein said adapter means is arranged to transmit the radio link protocol frames of the old radio system transparently in a payload field of the radio link protocol frames of the new radio system.

18. The telecommunication system according to claim 15, wherein the old and the new radio system are separate mobile communication system or different radio access networks of the same mobile system.

19. A data transmission method in a mobile communication system comprising a network element with a first link protocol provided with a retransmission mechanism for non-transparent data transmission; a radio access network with a second link protocol provided with a retransmission mechanism for non-transparent data transmission; and an interworking unit via which the radio access network is connected to the network element, the method comprising steps of:
  setting up the first link protocol from end to end between the mobile station and the network element;
  transmitting data in the frames of the first link protocol between the interworking unit and the network element;
  using frame numbering in said retransmission mechanism between the interworking unit and the network element; and
  adapting the first link protocol in the interworking unit to the radio access network so that the retransmission of data is controlled from end to end between the network element and the mobile station by means of said frame numbering, and
  said transmitting step comprising transmitting the frames of the first link protocol between the network element and the mobile station adapted to the traffic channel of the new radio system, such that said first link protocol is applied from end to end between the mobile station and the network element.

20. A data transmission method in a mobile communication system comprising a network element with a first link protocol provided with a retransmission mechanism for non-transparent data transmission; a radio access network with a second link protocol provided with a retransmission mechanism for non-transparent data transmission; and an interworking unit via which the radio access network is connected to the mobile services switching center, the method comprising steps of:
  transmitting data in the frames of the first link protocol between the interworking unit and the network element;
  using frame numbering in said retransmission mechanism between the interworking unit and the network element;
  adapting the first link protocol in the interworking unit to the radio access network so that the retransmission of data is controlled from end to end between the network element and the mobile station by means of said frame numbering; and
  negotiating, during the set-up of the connection between the mobile station and the network element, the manner in which the first link protocol is adapted to the radio access network.

21. The method according to claim 20, wherein said negotiating step comprises steps of:
  using signalling according to the first link protocol between the interworking unit and the network element;
  using signalling according to the second link protocol between the interworking unit and the mobile station; and
  performing a conversion between the two types of signalling in the interworking unit.

22. A data transmission method in a mobile communication system comprising a mobile services switching center with a first link protocol provided with a retransmission mechanism for non-transparent data transmission; a radio access network with a second link protocol provided with a retransmission mechanism for non-transparent data transmission; and an interworking unit via which the radio access network is connected to the mobile services switching center, the method comprising steps of:
  using the first link protocol between the interworking unit and the network element;
  transmitting data in the frames of the first link protocol between the interworking unit and the network element;
  using frame numbering in said retransmission mechanism between the interworking unit and the network element;
  using the second link protocol between the interworking unit and the mobile station;
  selecting the frame length and frame numbering of the first and the second link protocol identically; and
  performing a conversion between the link protocols in the interworking unit.

23. The method according to claim 19, further comprising a step of:
  selecting said first link protocol in the mobile station as a protocol version of said second link protocol by using signalling according to the second link protocol.

24. The method according to claim 19, wherein said adaptation to the traffic channel comprises a step of:
  inserting, in the mobile station or in the interworking unit, the frames of the first link protocol as such into protocol data units of a lower protocol layer on the traffic channel of the radio access system in place of the frames of the second link protocol.

25. The method according to claim 19, wherein said adaptation step comprises steps of:
  setting up said second link protocol between the mobile station and the interworking unit; and
  transmitting the frames of the first link protocol within the second link protocol.

26. The method according to claim 25, wherein said transmission step comprises steps of:
- inserting the frames of the first link protocol into the payload field of the frames of the second link protocol at the transmitting end;
- transmitting the frames of the second link protocol from the transmitting end to the receiving end;
- synchronizing the receiving end with the frames of the second link protocol;
- extracting the frames of the first link protocol from the payload field of the frames of the second link protocol; and
- operating with the extracted radio link protocol frames according to the radio link protocol and retransmission mechanism of the old radio system.

27. A mobile communication system comprising:
- a network element with a first link protocol provided with a retransmission mechanism for non-transparent data transmission and employing frame numbering;
- a radio access network with a second link protocol provided with a retransmission mechanism for non-transparent data transmission; and
- an interworking unit via which the radio access network is connected to the network element, wherein the interworking unit is arranged to adapt the first link protocol to the radio access network such that the first link protocol is set up and applied from end to end between the mobile station and the network element, the frames of the first link protocol are transmitted between the network element, and the retransmission of data is controlled from end to end between the network element and the mobile station by means of said frame numbering.

* * * * *